US007493854B2

(12) United States Patent
Etherton et al.

(10) Patent No.: US 7,493,854 B2

(45) Date of Patent: Feb. 24, 2009

(54) JAM DETECTION AND SAFETY DEVICE FOR JAMMING MACHINERY

(75) Inventors: John R. Etherton, Morgantown, WV (US); John R. Powers, Jr., Morgantown, WV (US); Eugene Anthony McKenzie, Jr., Morgantown, WV (US); Kenneth Means, Morgantown, WV (US); Brad Newbraugh, Fairmont, WV (US)

(73) Assignees: The Government of the United States of America as represented by the Secretary of the Department of Health and Human Services, Washington, DC (US); West Virginia University, Morgantown, WV (US)

( * ) Notice: Subject to any disclaimer, the term of this patent is extended or adjusted under 35 U.S.C. 154(b) by 93 days.

(21) Appl. No.: 11/593,980

(22) Filed: Nov. 6, 2006

(65) Prior Publication Data

US 2007/0101873 A1 May 10, 2007

Related U.S. Application Data

(60) Provisional application No. 60/735,046, filed on Nov. 8, 2005.

(51) Int. Cl.
*B30B 15/18* (2006.01)
*F16P 3/00* (2006.01)

(52) U.S. Cl. ............................ 100/48; 100/52; 100/99; 100/342; 100/98 R; 100/240

(58) Field of Classification Search .................. 100/35, 100/41, 43, 48, 50, 52, 342, 346, 98 R, 179, 100/226, 240, 245, 269.01, 99

See application file for complete search history.

(56) References Cited

U.S. PATENT DOCUMENTS

| | | | | |
|---|---|---|---|---|
| 3,695,172 | A * | 10/1972 | Cleary et al. | 100/45 |
| 4,584,935 | A | 4/1986 | Luggen | |
| 4,627,341 | A | 12/1986 | Sudbrack et al. | |
| 4,658,719 | A * | 4/1987 | Jackson et al. | 100/218 |
| 5,353,698 | A | 10/1994 | Robbins | |

(Continued)

OTHER PUBLICATIONS

American Baler Company, Pathfinder Plus Control System, "Touch Screen Simplifies Baler Operation," http://www.americanbaler.com/htmlpages/options_screen_overview.htm (1 page).

(Continued)

*Primary Examiner*—Jimmy T Nguyen
(74) *Attorney, Agent, or Firm*—Klarquist Sparkman, LLP

(57) ABSTRACT

The present disclosure concerns a jam detection and safety system for machines prone to jamming, such as a baler. In particular embodiments, the system is implemented in a horizontal baler having a shear bar and a hydraulic ram that advances material being baled past the shear bar into a compression chamber. The system includes a strain gage mounted on the shear bar and a controller that is electrically connected to the strain gage. The controller receives strain signals from the stage gage and compares the strain of the shear bar to a predetermined strain threshold corresponding to a jamming condition. If the strain exceeds the predetermined threshold, the controller automatically deactivates the ram, such as by disconnecting line power from the baler and/or by turning off the control power of the baler.

7 Claims, 7 Drawing Sheets

U.S. PATENT DOCUMENTS

| | | | | |
|---|---|---|---|---|
| 5,463,944 | A | 11/1995 | Wolf et al. | |
| 5,845,568 | A | 12/1998 | Rosser, Jr. | |
| 6,055,902 | A * | 5/2000 | Harrop et al. | 100/52 |
| 6,729,229 | B1 | 5/2004 | Wildes et al. | |
| 6,742,448 | B1 | 6/2004 | Davis et al. | |
| 6,786,143 | B2 | 9/2004 | Leupe et al. | |
| 6,913,226 | B2 | 7/2005 | Huyne | |

OTHER PUBLICATIONS

Bollegraaf Recycling Machinery, Bollegraaf Information & Operating System, http://www.bollegraaf.com/bios.htm (1 page).

Etherton, et al., "Safety Factors Relating to Monitored Compactor Operating Parameters," *Safety Engineering and Risk Analysis*, vol. 8: 1998 (11 pages).

Etherton, et al., "The Machine Operator's Jammed-Feedstock-Clearing Task: A Safety Design Challenge," Proceedings of 2001 ASME Int'l Mechanical Engineering Congress and Exposition, Nov. 11-16, 2001 (6 pages).

Fortress Interlocks: Total Access & Control, Safety Gate Switches, http://www.fortressinterlocks.info/index.asp?area=products (1 page).

Mick, et al., "Design Recommendations for Controlling the Jam-Clearing Hazard on Recycling Industry Balers," Proceedings of IMECE2005, Nov. 2005 (5 pages).

National Institute for Occupational Safety and Health, US Dept. of Health and Human Services—Public Health Service, "Hazard Controls—Control of Scrap Paper Baler Crushing Hazards," DHHS (NIOSH) Publication No. 97-113, Apr. 1997 (4 pages).

Sierra International Machinery, LLC, The Macpress Baler Supervisor, http://www.sierraintl.com/waste_acc_baler.html (1 page).

* cited by examiner

JAM DETECTION AND SAFETY DEVICE FOR JAMMING MACHINERY

CROSS-REFERENCE TO RELATED APPLICATION

The present application claims the benefit of U.S. Provisional Application No. 60/735,046, filed Nov. 8, 2005, which is incorporated herein by reference.

ACKNOWLEDGMENT OF GOVERNMENT SUPPORT

This invention was made by the National Institute for Occupational Safety and Health, Centers for Disease Control and Prevention, an agency of the United States Government.

FIELD

The present disclosure concerns a jam detection and safety device for machinery, such as a baler, that protects against operator injury when such machinery becomes jammed during its normal operation.

BACKGROUND

Baling machines ("balers") are used to bale waste and other compressible materials, such as for transporting waste material to a disposal site. In a conventional "horizontal" baler, the material to be baled is allowed to fall under gravity through a chute and into a receiving chamber. A ram or platen powered by a hydraulic cylinder moves the material into a compression chamber and compresses the material therein. A shear bar located at the entrance of the compression chamber shears off excess material extending into the chute as the ram advances the material into the compression chamber. Once the material has attained a sufficient degree of compression, bale tie wires are wrapped around the material to form a bale.

During the baling process, material occasionally becomes jammed between the ram and the shear bar. Typically, the only way to remove the jam is to manually remove the material causing the jam, which requires the operator to insert a hand or arm into the baler. While lockout and tagout procedures reduce the risk of operator injury, they can be easily bypassed, ignored, or forgotten. If the baler is not de-energized and properly locked out prior to the clearing process, the baler could be accidentally re-started while the operator is removing the jam from the baler, causing serious injury (such as traumatic amputation) to the operator or possibly death. For example, between 1986 and 2002, there were 43 fatal injuries to operators of recycling industry balers in the Unites States.

Accordingly, there exists a need for a safety device for balers and other jamming machinery that can protect against operator injury when a jam occurs.

SUMMARY

The present disclosure concerns a jam detection and safety system for a machine prone to jamming. A jam occurs when material being processed or handled by the machine becomes lodged inside the machine and must be removed by the operator before operation of the machine can resume. Without limitation, examples of such machines include balers and agricultural harvesting equipment, such as combines and corn pickers. The system includes at least one strain gage mounted on a component of the machine that experiences increased strain when material becomes lodged in the machine. During operation of the machine, the strain of the component is detected and compared to a reference or predetermined strain threshold corresponding to a jam condition. If the strain of the component exceeds the predetermined strain threshold, the machine is automatically deactivated by de-energizing the machine or blocking drive power from the moving components in the area of the jam.

In particular embodiments, the system is implemented in a horizontal baler having a shear bar and a hydraulic ram that advances material being baled past the shear bar into a compression chamber. The system includes a strain gage mounted on the shear bar and a controller that is electrically connected to the strain gage. The controller receives strain signals from the stage gage and compares the strain of the shear bar to a predetermined strain threshold corresponding to a jamming condition. If the strain exceeds the predetermined threshold, the controller automatically deactivates the ram, such as by disconnecting line power from the baler and/or by turning off the control power of the baler. The controller can also include an alarm mechanism which can be, for example, an audible and/or visual alarm (e.g., a light bulb or LED) that is activated when a jam occurs to warn the operator of the condition. After the ram is deactivated, the operator can then access the baler, for example, through an access door of the baler loading chamber to remove the material causing the jam.

In another embodiment, the controller also is configured to monitor the hydraulic pressure of the ram in addition to the strain of the shear bar. In this embodiment, the controller deactivates the ram if the pressure exceeds a predetermined pressure threshold corresponding to a jam and if the shear bar strain exceeds the predetermined strain threshold.

The system also can be provided with one or more trapped key switches to protect against accidental re-starting of the ram while the operator is clearing the jam. In one embodiment, for example, a first trapped key switch is provided on the controller and a second trapped key switch is provided on an electrical panel connecting line power to the baler. Both switches are operated by the same key. During normal operation of the baler, the key is retained in the first key switch and can only be removed by supplying an electrical signal to the switch. When a jam is detected, the controller sends the electrical signal to the first switch to release the key. The operator then removes the key, inserts it into the second trapped key switch and turns the switch to the off position, effectively locking out the electrical panel. The second key switch becomes locked in the off position and retains the key, thereby isolating line power from the baler until an electrical signal is provided to the switch. After the jam is cleared and the operator is at a safe location outside of the baler, the operator presses a re-start button on the controller, which sends the electrical signal to the second switch to release the key. At this point, the operator can then turn the second key switch back to the on position, connect line power to the baler, return the key to the first key switch and re-start the baler.

The foregoing and other objects, features, and advantages of the invention will become more apparent from the following detailed description, which proceeds with reference to the accompanying figures.

DETAILED DESCRIPTION

As used herein, the singular forms "a," "an," and "the" refer to one or more than one, unless the context clearly dictates otherwise.

As used herein, the term "includes" means "comprises." For example, a device that includes or comprises A and B contains A and B but may optionally contain C or other components other than A and B. A device that includes or comprises A or B may contain A or B or A and B, and optionally one or more other components such as C.

The present disclosure concerns a jam detection and safety system for a machine prone to jamming. A jam occurs when material being processed or handled by the machine becomes lodged inside the machine and must be removed by the operator before operation of the machine can resume. Without limitation, examples of such machines include balers and agricultural harvesting equipment, such as combines and corn pickers. The system includes at least one strain gage mounted on a component of the machine that experiences increased strain when material becomes lodged in the machine. During operation of the machine, the strain of the component is detected and compared to a reference or predetermined strain threshold corresponding to a jam condition. If the strain of the component exceeds the predetermined strain threshold, the machine is automatically deactivated by de-energizing the machine or blocking drive power from the moving components in the area of the jam.

In the case of a baler, material that is being baled can become lodged between the shear bar and the hydraulic ram that advances the material past the shear bar. The strain gage is mounted to the shear bar so that the strain of the shear bar can be measured. If the strain exceeds the predetermined strain threshold, indicating that a jam has occurred, the ram is automatically deactivated to permit removal of the jam. In another example, a strain gage can be mounted on the feed rolls of a combine. If material becomes jammed in the feed rolls, the increased strain of the feed rolls is detected and the combine is deactivated to permit removal of the jam.

Figure 1:
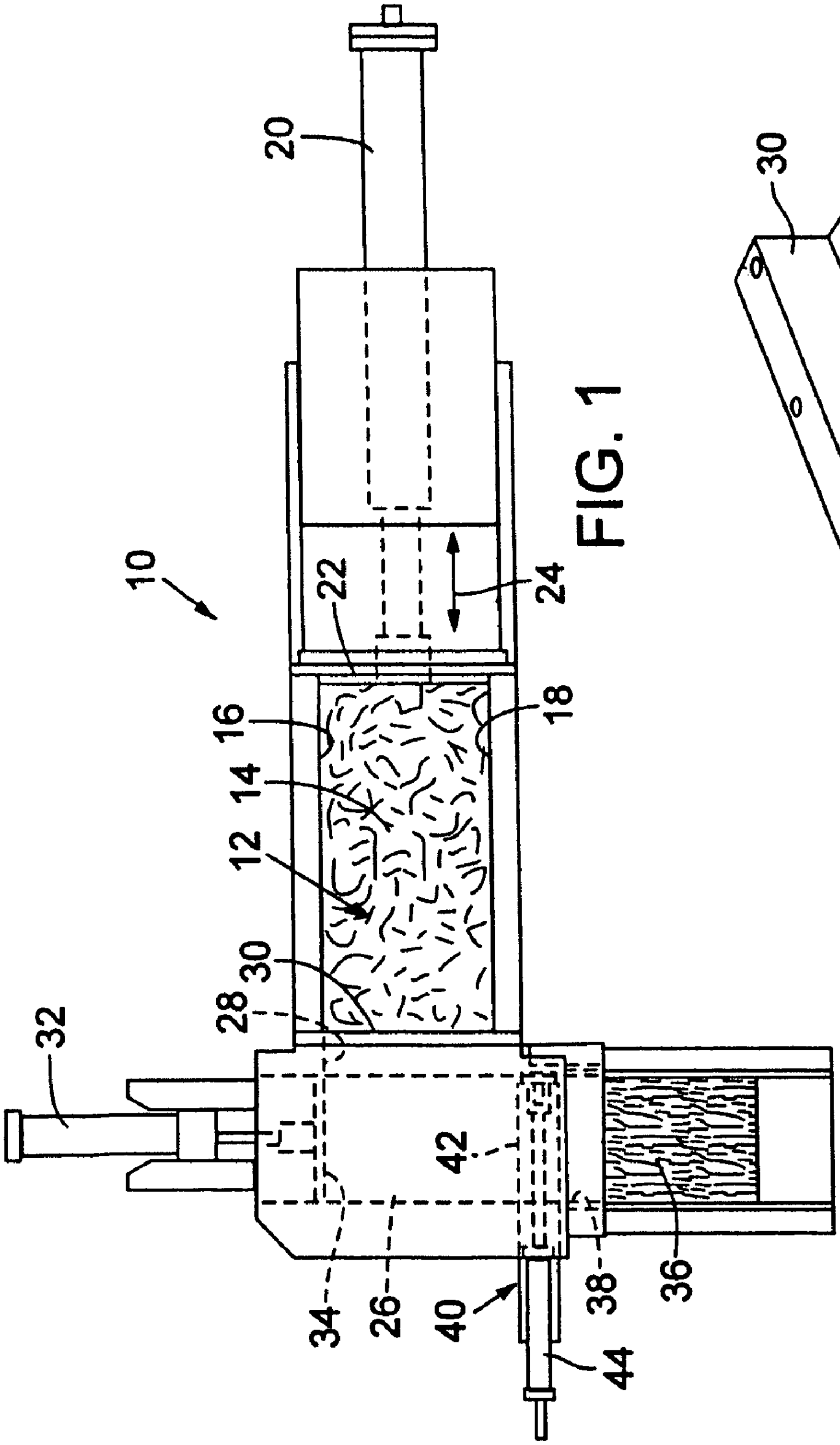
FIG. 1 is a schematic, overhead plan view of a horizontal baler in which a jam detection and safety system can be implemented.

In a specific example, the jam detection and safety system can be implemented in a typical conventional horizontal baler 10, as depicted in FIG. 1. The baler 10 can be a new baler manufactured with the system or an existing baler retrofitted to include the system. While the illustrated embodiment shows a horizontal baler, the system also can be implemented in a vertical baler.

Referring to FIG. 1, the baler 10 is designed for baling waste material such as paper (e.g., newspapers and magazines), cardboard, corrugated containers, used beverage cases, municipal solid waste, etc. The baler 10 has a charging, or loading, chamber 12 into which waste material 14 is loaded. Waste material 14 typically is fed into the open top of the loading chamber by a conveyor (not shown). Although not shown, the baler 10 typically includes a vertical chute with flared side walls disposed above the loading chamber 12 to assist in directing waste material from the conveyor into the loading chamber.

The loading chamber 12 is generally rectangular in horizontal section having a flat floor, a side wall 16, and an access door 18 opposite side wall 16. The baler 10 includes a hydraulic compression cylinder 20 having a ram 22 that is movable horizontally in the loading chamber, as indicated by double-headed arrow 24. Movement of the ram 22 is controlled by an electrically-powered hydraulic pump (not shown).

The loading chamber 12 communicates with a compression chamber 26 through a charging passage 28. The waste material 14 is compressed from the loading chamber 12 into the compression chamber 26 by forward movement of the ram 22 toward the compression chamber. A horizontally disposed shear bar 30 is positioned at the forward end of the loading chamber 12 above the height of the ram. As the ram 22 pushes the waste material past the shear bar 30 into the compression chamber 26, material extending above the open top of the loading chamber is sheared off by the shear bar.

The baler 10 further includes a bale ejection cylinder 32 having an ejection ram 34 that is movable horizontally in the compression chamber 26. The compression chamber 26 is provided with an exit passageway 38. An exit gate mechanism 40 is mounted in the exit passageway 38. The exit mechanism 40 includes a slidable gate 42 which is movable between a closed position (as shown in FIG. 1) and an open position by a hydraulic exit gate cylinder 44.

In normal operation, the loading chamber 12 is filled with waste material 14 and then the ram 22 is advanced to push the waste material through the charging passage 28 and into the compression chamber 26. The ram 22 advances toward the compression chamber 26 and stops when it is substantially flush with the corresponding side of the ejection ram 34 to form a bale 36. After the exit gate 42 is opened, the ejection ram 34 is advanced step-by-step to push the bale out of the compression chamber 26 through the exit passage 38. The bale 36 is tied by a strapping mechanism of conventional design (not shown). Typically, the baler is operated such that at each pause between incremental advances of the ejection ram 34, the ejected material is tied with an encircling strap or wire by the strapping mechanism located just outside the exit passage 38.

After the bale 36 is completely ejected from the compression chamber 26, the exit gate 42 is closed. Loading of waste material into loading chamber 12, compression of the waste material in the compression chamber 26 and ejection therefrom is thus repeated to form any number of bales 36.

As noted above, the baler 10 is equipped with a jam detection and safety system. During operation of the baler, waste material can become lodged between the shear bar 30 and the ram 22, preventing advancement of the ram to its forward-most position. When this occurs, the jam typically must be cleared by an operator who accesses the loading chamber 12 (usually through access door 18 or by removing another panel of the baler) and manually removes the material. The jam detection and safety system automatically detects when a jam occurs and protects against operator injury during the removal process.

Figure 2:
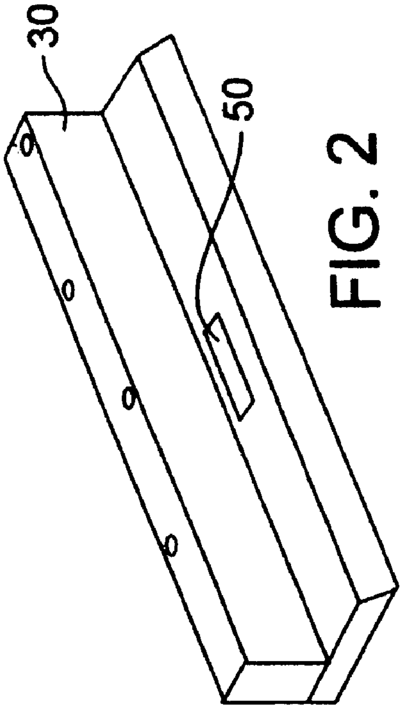
FIG. 2 is a perspective view of a shear bar of the baler having a strain gage mounted thereon to allow measurement of the strain experienced by the shear bar during the baling process.
Figure 3:
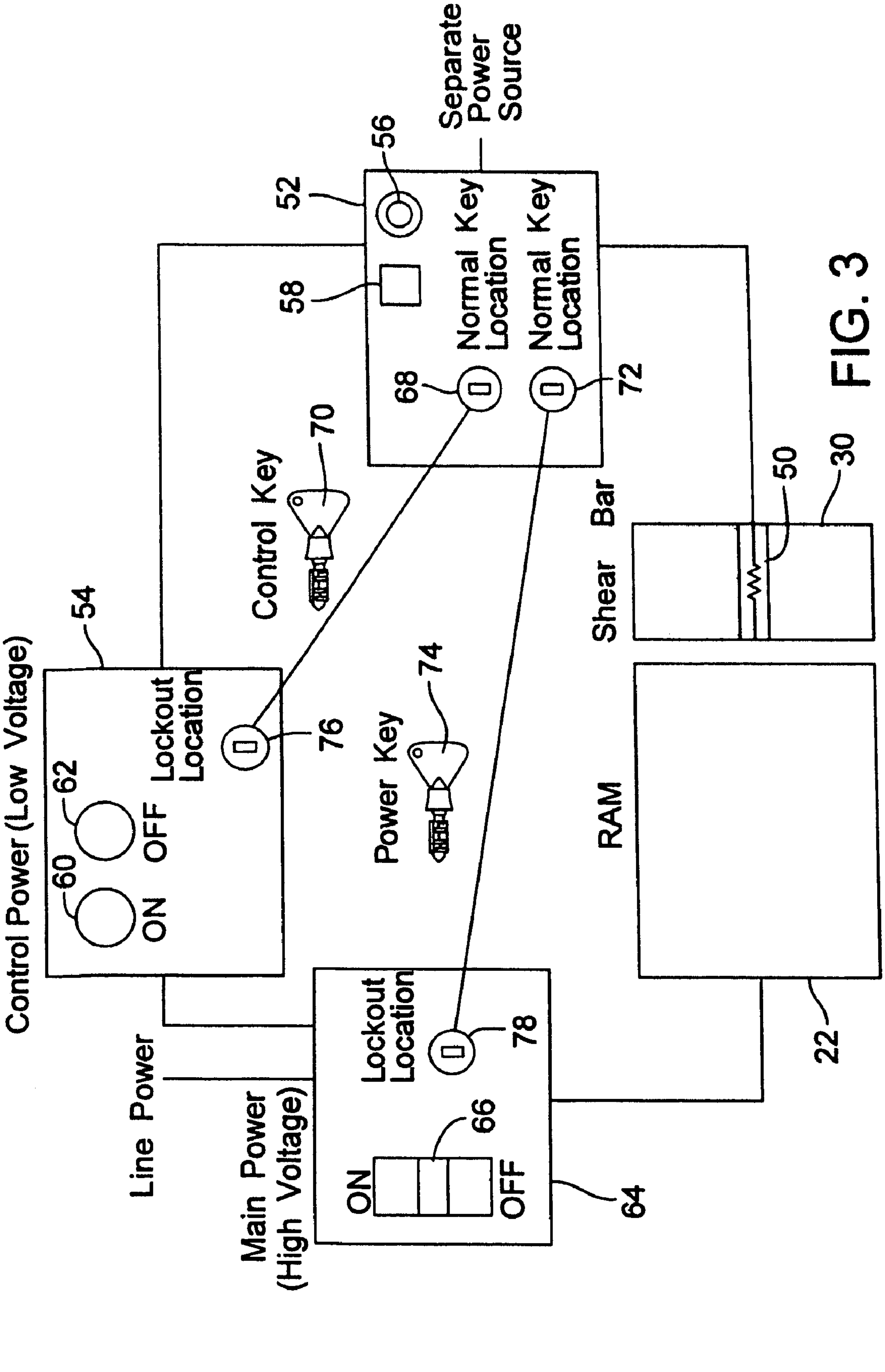
FIG. 3 is a schematic block diagram of a jam detection and safety system for the baler shown in FIG. 1, according to one embodiment.

Referring to FIGS. 2 and 3, the jam detection and safety system includes a strain gage 50 mounted on the shear bar 30 of the baler 10. The strain gage 50 detects the strain of the shear bar 30 during operation of the baler to determine whether waste material 14 has become lodged between the shear bar 30 and the ram 22. As depicted in FIG. 2, the strain gage 50 desirably is mounted at about the middle of the length of the shear bar 30, since this location typically experiences the greatest amount of strain during operation of the baler.

As shown in FIG. 3, the safety apparatus in the illustrated embodiment includes a primary controller 52 electrically connected to the strain gage 50. The primary controller 52 is connected to a power source separate from that of the baler 10 so that it can remain operable when the baler is shut down to clear a jam. The primary controller 52 can include an alarm mechanism 56, which is activated when a jam is detected by the controller. The alarm mechanism 56 can be, for example, an audible and/or visual alarm (e.g., a light bulb or LED). The primary controller 52 also includes a manual re-start button 58 that permits re-starting of the baler 10 once a jam is cleared, as described in greater detail below.

A conventional baler typically includes a control panel 54 (also known as an operator's panel) that is electrically connected to a main electrical panel 64, which in turn is connected to a three-phase, high-voltage power line (circuit) (e.g., 230 v or greater). The control panel 54 typically includes manual on and off buttons 60 and 62, respectively, and other buttons (not shown) that control the operation of the baler, as known in the art. The main power panel 64 includes a conventional on-off switch 66 (e.g., a disconnect lever) that is used to isolate the baler 10 from line power. The control panel 54 provides low-voltage control power (e.g., 24 v) to the electrical components of the baler 10. The motor of the ram 22 is connected via a three-phase power circuit to the control panel 54 and the electrical panel 64 in a conventional manner. Thus, the motor of the ram 22 can be effectively de-energized by disconnecting the panel 64 from the power line or by turning off the control power at the control panel 54.

The primary controller 52 is electrically connected to the control panel 54. In particular embodiments, the control panel 54 is mounted on the baler 10 and the primary controller 52 desirably is mounted at a location spaced from the control panel 54 (as depicted in FIG. 3), either on the baler 10 or at a convenient location adjacent the baler. Alternatively, the primary controller 52 and the control panel 54 can share a common housing.

If waste material becomes lodged between the shear bar 30 and the ram 22, the shear bar 30 will undergo an increase in strain. Thus, to detect whether a jam has occurred, the strain gage 50 continuously monitors the strain of the shear bar 30 and sends the strain values to the primary controller 52. The controller 52 compares each strain value to a predetermined strain threshold corresponding to a jam condition. If the measured strain exceeds the predetermined strain threshold, the controller 52 activates the alarm mechanism 56 to warn the operator that a jam has occurred. The controller 52 also sends a signal to the control panel 54 to retract the ram 22 away from the shear bar 30 and then deactivate the ram 22 by turning off the control power at the control panel 54 so that the jam can be removed.

The maximum shear experienced by the shear bar 30 when a jam occurs depends in part on the material that is being baled and the sharpness of the shear bar. For example, and as described in the example below, it has been found that newspaper generally causes greater strains than cardboard and magazines. Additionally, a dull shear bar experiences greater maximum strain than a relatively sharper shear bar. The predetermined strain threshold therefore can be set at a value corresponding to jam under the worst case operating conditions. For example, if the baler is used to bale cardboard, magazines, and newspapers, the strain threshold preferably would be set at a greater value than if the baler is used only to bale cardboard or magazines. Likewise, when using a baler having a dull shear bar, the strain threshold preferably would be set at a greater value than when using a relatively sharper shear bar. The controller 52 can include an input key pad, tuning knob or other suitable controls to allow the operator to set the predetermined strain. In addition to or in lieu of such controls, the controller 52 can be adapted to connect to a general purpose computer (e.g., a laptop computer) via a conventional wired or wireless connection for setting the predetermined strain value and/or recording strain data detected by the strain gage.

The rate of change of shear bar strain alternatively can be used as an indicator of a baler jam. For example, in one embodiment, the controller 52 can be programmed to calculate the rate of change of strain detected by the strain gage 50, compare the rate of change of strain to a predetermined value corresponding to a jam, and send a signal to the control panel 54 to retract and deactivate the ram 22 if the rate of change of strain exceeds the predetermined value.

To protect against machine overload, known balers typically are provided with a pressure switch (not shown) that detects the hydraulic pressure of the ram 22. When enough pressure is detected, the pressure switch actuates and controls the ram to retract and/or deactivate. The primary controller 52 can be operatively connected to the pressure switch or otherwise configured to monitor the hydraulic pressure of the ram 22. Thus, in this implementation, the primary controller 52 monitors both strain of the shear bar 30 and the hydraulic pressure of the ram 22 to determine whether a jam has occurred. If the measured strain exceeds the predetermined strain threshold and the pressure switch is activated, the controller 52 activates the alarm mechanism 56 and sends a signal to the control panel 54 to retract the ram and shut-down the baler 10.

In an alternative embodiment, the primary controller 52 can be configured to communicate with the main panel 64. When a jam is detected, the primary controller 52 deactivates the ram 22 by sending a signal to the main panel 64 to disconnect line power from the baler 10. In another embodiment, the controller 52 sends a signal to the main panel 64 to isolate the baler from line power and a second signal to the control panel 54 to turn off the control voltage when a jam is detected.

The safety apparatus also can be provided with one or more lockout devices to protect against inadvertent re-starting of the baler while the operator is clearing the jam. In the illustrated embodiment, for example, the primary controller 52 is provided with a first, trapped key switch 68 and a second, trapped key switch 72. The configuration of the switches 68, 72 can be conventional. A trapped key switch, such as switches 72, 74, can be moved between an "on" position and an "off" position by manually turning a key in the switch. When the switch is in either the "on" or "off" position, a solenoid (or equivalent mechanism) prevents movement of the switch back to the other position and prevents removal of the key until an electrical signal activates the solenoid to permit operation of the switch. For example, the switch can be configured such that when the switch is turned to the "off" position, the solenoid prevents movement of the switch back to the "on" position and prevents removal of the key until an electrical signal activates the solenoid to permit operation of the switch.

The first key switch 68 is operated by a first, "control" key 70 to activate the control panel 54. When the first key 70 is inserted into the first switch 68 and the switch is moved to the "on" position, control voltage at the control panel 54 is turned on. Conversely, turning the first switch 68 to the "off" position turns off the control voltage at control panel 54. The second key switch 72 is operated by a second, "power" key 74 to activate the main panel 64. Turning the second key switch 72 to the "off" position disconnects line power from the main power. Turning the second key switch 72 to the "on" position and turning on switch 66 connects line power to the baler 10. During normal operating conditions, the switches 68, 72 are "locked" in their power "on" positions and the keys 70, 74 are retained in the switches 68, 72. The keys cannot be removed from switches 68, 72 until the controller 52 sends electrical signals to the switches to release the keys.

The control panel 54 is provided with a third, trapped key switch 76 that is operated by the first key 70. The main panel 64 is provided with a fourth, trapped key switch 78 that is operated by the second key 74. The third key switch 76 is used to lockout the control panel 54, while the fourth key switch 78 is used to lockout the main panel 64. When a jam is detected, the controller 52 sends an electrical signal to the solenoid of the first key switch 68 to release key 70. The operator then turns the first key switch 68 to the "off" position, removes the first key 70, inserts it into the third key switch 76, and turns the third key switch to the "off" position to lockout the control panel 54. When the third key switch 76 is turned off, the controller 52 sends a signal to the second key switch 72 to release the second key 74. The operator then removes the second key 74 from the second key switch 72, inserts it into the fourth key switch 78, and turns the fourth key switch to the "off" position to lockout the main power panel. When the key switches 76, 78 are turned off, the keys 70, 74 become trapped and the switches cannot be moved back to their respective "on" positions until the controller 52 signals the switches to release the keys. At this point, the control panel 54 and the main panel 64 are locked out and the operator can enter the baler to clear the jam.

Once the jam is cleared and the operator is at a safe location outside of the baler, the operator presses the re-start button 58 on the primary controller 52, which sends a respective electrical signal to the third and fourth key switches 76, 78 to release the keys. The operator can then replace the keys back into the first and second key switches 68, 72 to resume normal operation of the baler.

In a less sophisticated embodiment, key switch 68 and key switch 76 are not provided. Thus, in this embodiment, only the main panel 64 is locked out when the baler is shut down to clear a jam. In another embodiment, key switch 72 and key switch 78 are not provided, in which case only the control panel 54 can be locked out using a trapped key device. In another embodiment, switches 68, 72 are operated by keys 70, 74 but are not of the trapped key type, in which case the controller 52 need not send signals to the switches to release the keys.

To further protect against inadvertent re-starting of the baler, the access door 18 of the loading chamber 12 can be provided with an interlock switch (not shown) that prevents start-up of the baler if the door is in the open position. In one embodiment, for example, the controller 52 detects the condition of the interlock switch to control the operation of the key switches 76, 78. If the operator presses the re-start button 56 while the access door is open, the controller 52 detects that the interlock switch is not activated and does not permit the release of the keys 70, 74 from the key switches 76, 78, respectively. However, if the access door is closed, the controller 52 detects that the interlock switch is activated and permits the release of the keys 70, 74 from the key switches 76, 78, respectively. If the baler includes other access doors and/or panels that are removed to access the inside of the bale, additional interlock switches can be provided on other the doors and/or panels. In that case, the controller 52 would ensure that each door and/or panel is in the closed position before the baler can be re-restarted.

The jam detection and safety system can also be provided with other types of lockout devices to protect against accidental re-starting of the baler while the operator is removing a jam. For example, the controller 52 can be provided with biometric controls, such as a fingerprint reader, that prevents re-starting of the baler unless activated by the operator.

Figure 4A:
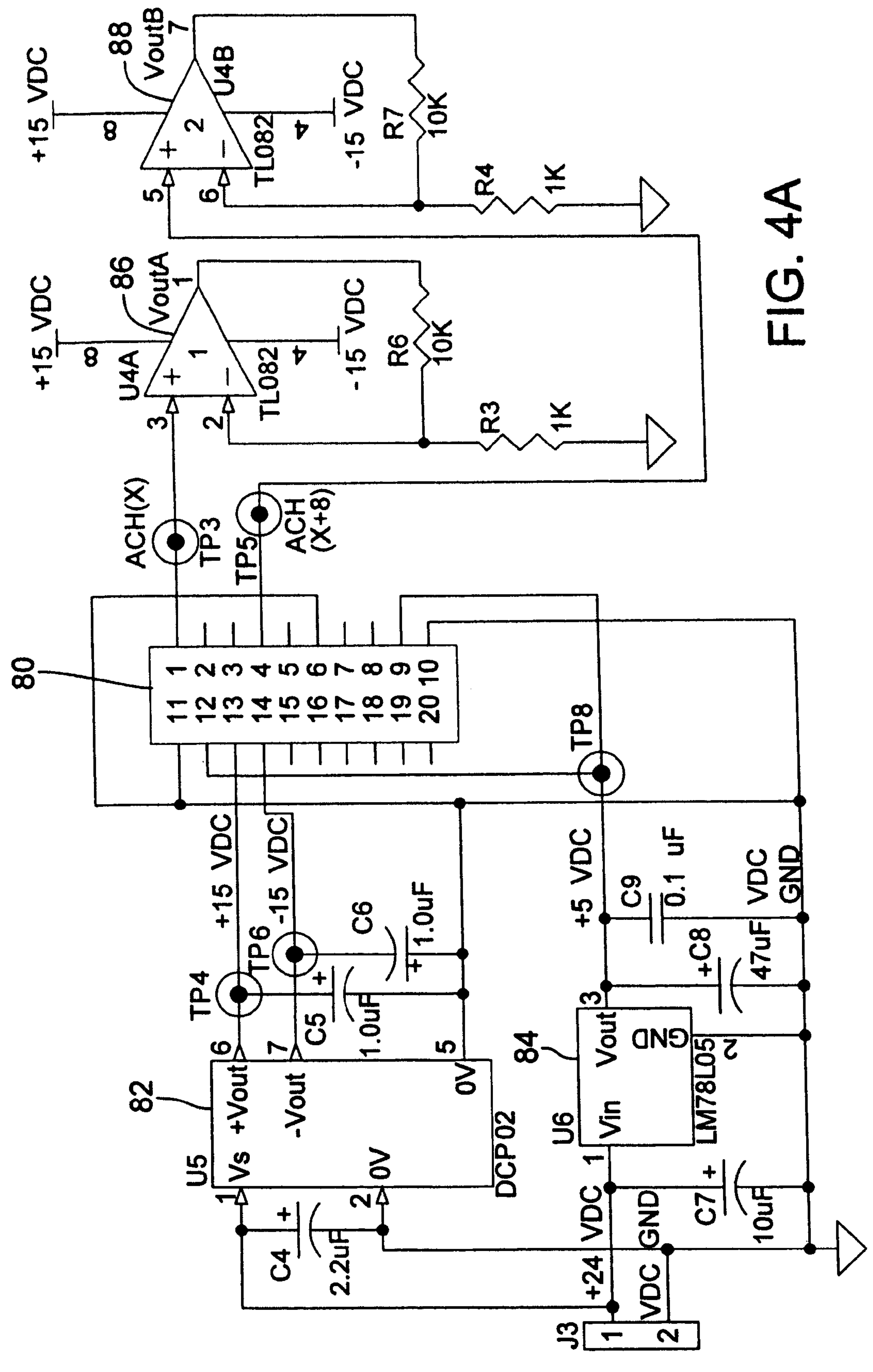
FIGS. 4A and 4B are an electrical schematic of the jam detection and safety system shown in FIG. 3.
Figure 4B:
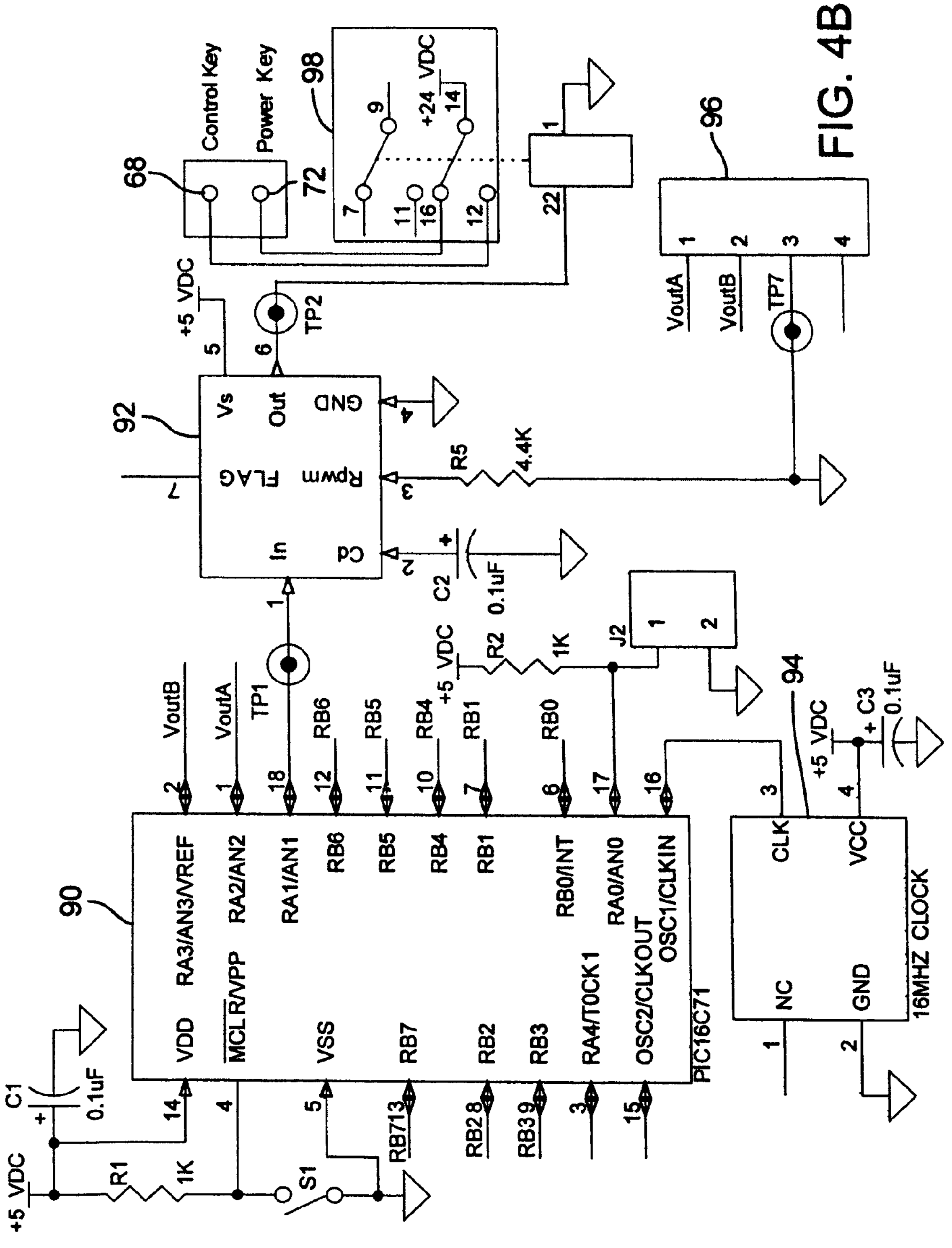

FIGS. 4A and 4B show an electrical schematic of the safety apparatus. As shown in FIG. 4A, a connector 80 is connected to voltage regulators 82 and 84 and amplifiers 86 and 88. Connector 80 interfaces with a 120-Ohm quarter bridge strain gage module (not shown), which in turn is connected to the strain gage 50 (FIG. 2). Voltage regulator 82 provides + and −15 VDC to power the strain gage 50 and amplifiers 86, 88. Voltage regulator 84 provides +5 VDC to power the strain gage 50, a microcontroller 90, a liner driver 92, and a clock 94 (FIG. 4B). Amplifiers 86, 88 function to boost the output voltage signal from the strain gage 50 before it is transmitted to the microcontroller 90. The microcontroller 90 records the output signal from the strain gage 50 and compares it to a predetermined strain threshold corresponding to a jam in the baler. If the output signal from the strain gage exceeds the predetermined strain threshold, the microcontroller 90 turns off the control voltage at the control panel 54 and sends a signal to the activate line driver 92. The line driver 92 energizes a relay 98, which connects a 24 VDC signal from the line driver to the solenoid of each key switch 68, 72 to release the keys 70, 74.

In an exemplary embodiment of the jam detection and safety system, the strain gage 50 comprises a 0.5 inch long, CEA series strain gage manufactured by Vishay Measurements Groups (Shelton, Conn.). The strain gage module comprises a National Instruments (Austin, Tex.) model SCC-SG01, 120-Ohm quarter bridge strain gage module. The trapped key switches 68 and 72 each comprises a Fortress (United Kingdom) model SS1-MILN-4D024 key switch; the trapped key switch 76 comprises a Fortress model S-MLIN-A0062; and the trapped key switch 78 comprises a Fortress model SS1-MLIN-A06322 D024B (63 amps) key switch.

Figure 5:
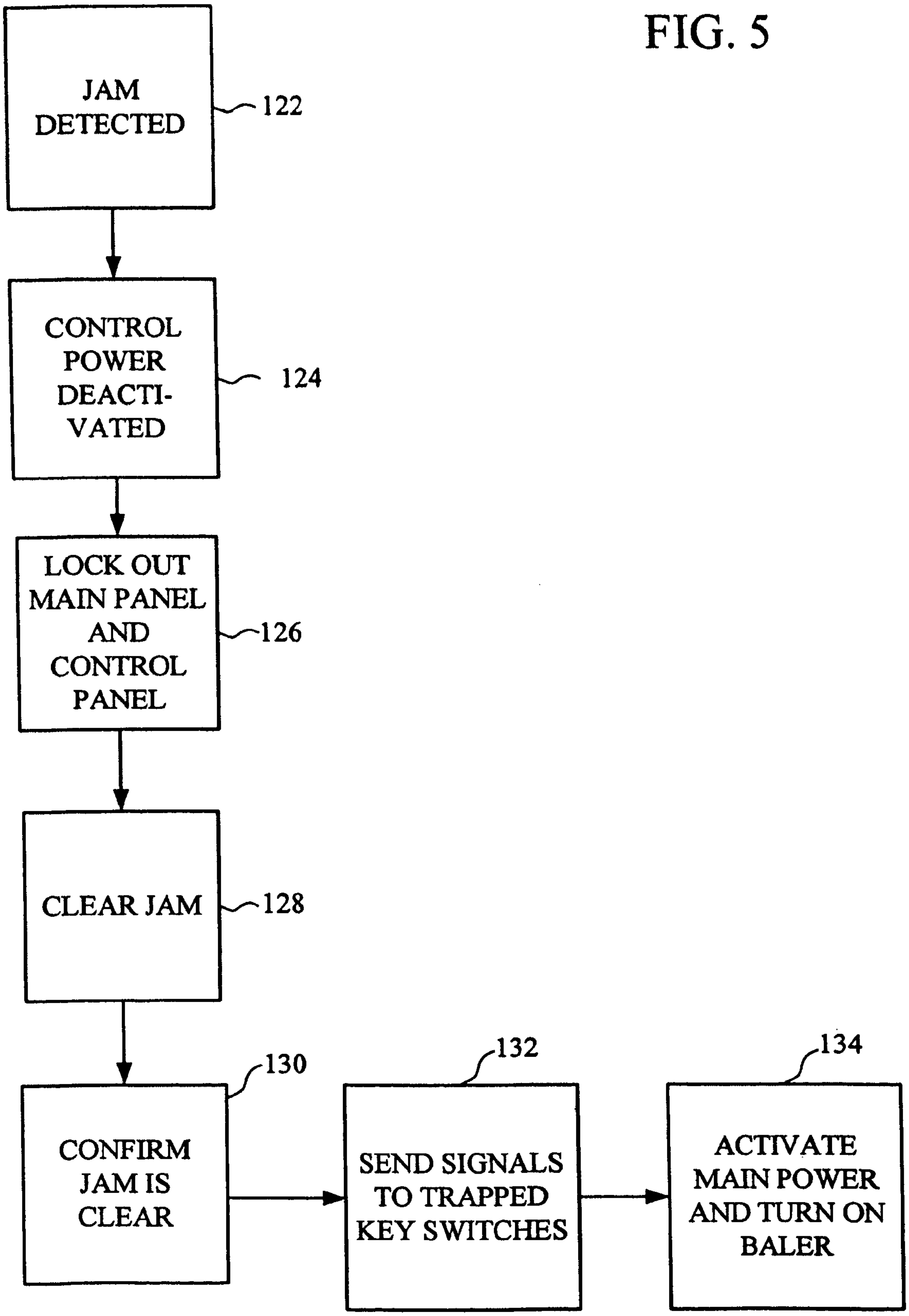
FIG. 5 is a flowchart illustrating the operation of the jam detection and safety system, according to one embodiment.

FIG. 5 is a flowchart illustrating the operation of the jam detection and safety system, according to one embodiment. When a jam is detected (as indicated at 122), the controller 52 automatically deactivates the baler by turning off control power at the control panel 54. The operator then removes the keys 70, 74 from their respective switches 68, 72 on the controller 52, inserts the keys into trapped key switches 76, 78, and locks out the control panel 54 and the main panel 64 (as indicated at 126). Once the baler is properly locked out, the operator can access the inside of the baler to remove the jam (as indicated at 128). After clearing the jam and when the operator is at a safe location outside of the baler, the operator confirms that the jam has been cleared by pressing the re-start button 58 on the controller 52 (as indicated at 130). As indicated at 132, pressing the re-start button 58 causes the controller 52 to send electrical signals to the trapped key switches 76, 78 to release the keys 70, 74. The operator can then replace the keys 70, 74 back into switches 68, 72 on the controller 52, connect line power at the main panel 64, and turn on the baler using the control panel 54 to resume normal operation (as indicated at 134).

EXAMPLE

This example demonstrates how the maximum strain experienced by a shear bar can be calculated. To simulate a jamming situation, a Baldwin testing machine with a load capacity of 200,000 pounds was used to apply a shearing force to a bundle of recyclable material. Attached to the testing machine was a scaled model of a shear bar found in a recycling baler. Force was applied by the testing machine to the shear bar, which was lowered onto a bundle of material. The bundle of material was balanced on a block that simulated the ram of the baler. As the shear bar compressed and cut the material, the bundle of material was free to rotate. The shear bar continued to travel through the material and progressed two inches beyond the end of the block. This simulated the action of the ram forcing recyclable material against the shear bar in an actual baler.

While the material was being sheared, a load cell with a capacity of 25,000 pounds mounted above the shear bar transmitted a voltage proportional to the force exerted on the shear bar. The signal from the load cell was transmitted to a laptop computer where LabVIEW was used to convert the voltage into force. A linear variable displacement transducer (LVDT) was also mounted to the head of the loading machine. This device recorded the distance the shear bar traveled while shearing through the material. This signal also was transmitted to the laptop and LabVIEW was used to convert this signal to distance. Data was recorded through LabVIEW at 100 samples per second.

This procedure was conducted for a sharp shear bar, a shear bar with a 1/64 inch radius on its cutting edge, and a shear bar with a 1/32 inch radius on its cutting edge. Each shear bar was used to shear a bundle of cardboard, a bundle of newspaper, and a bundle of magazines. Each bundle of material was eight inches wide, four inches tall, and sixteen inches long. The material bundle was placed on the block simulating the ram with the end of the bundle extended past the edge of the block. The shear bar was then lowered to a location directly above the top of the bundle, at which point the LVDT output was set at zero. The valve for the testing machine was then opened and the flow control knob was turned 1.5 times. This caused the table of the machine to raise the material into the shear bar at a constant rate of 0.057 inches per second. The material was continuously sheared and compressed until the testing machine shut off at its limit of travel (six inches). This allowed the shear bar to advance through the bundle and two inches beyond the edge of the block. This procedure was repeated four times for each material with each of the three shear bars.

Figure 6:
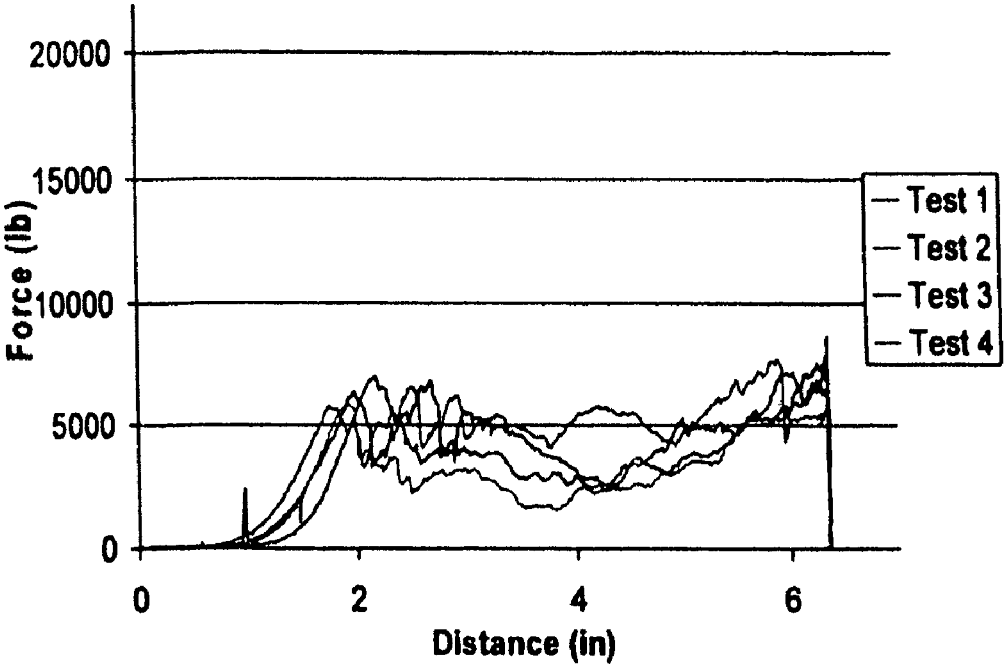
FIG. 6 shows four separate graphs of the force of a sharp shear bar when being used to shear a bundle of newspaper.

Using the sharp shear bar, it was found that the maximum force achieved when shearing cardboard and magazines was approximately 6,000 pounds. Newspaper created a larger maximum force of approximately 8,000 pounds. A plot of the data collected for each iteration conducted using newspaper is shown in FIG. 6. It can be seen that the force increases as the material is initially compressed by the shear bar. Once the shear bar begins to cut through the material, the force begins to decrease. The force then increases again after about the first four inches of travel. At this point, the material is compressed in the 0.25 inch gap between the shear bar and the block. The same trend occurred for each of the shear bars.

Figure 7:
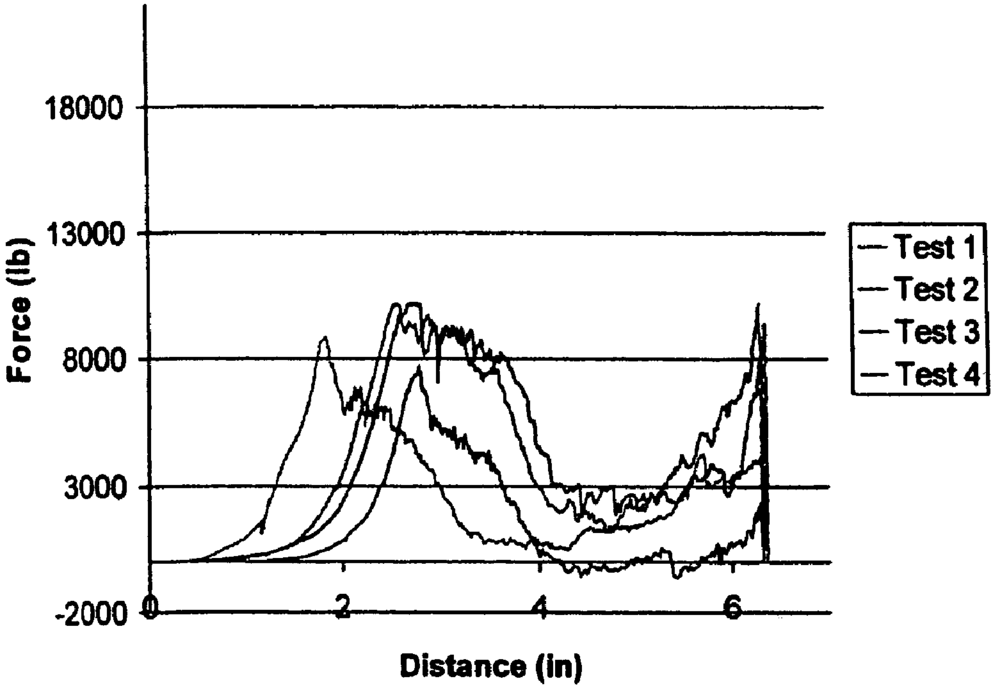
FIG. 7 shows four separate graphs of the force of a shear bar having a 1⁄64" radius edge when being used to shear a bundle of newspaper.
Figure 8:
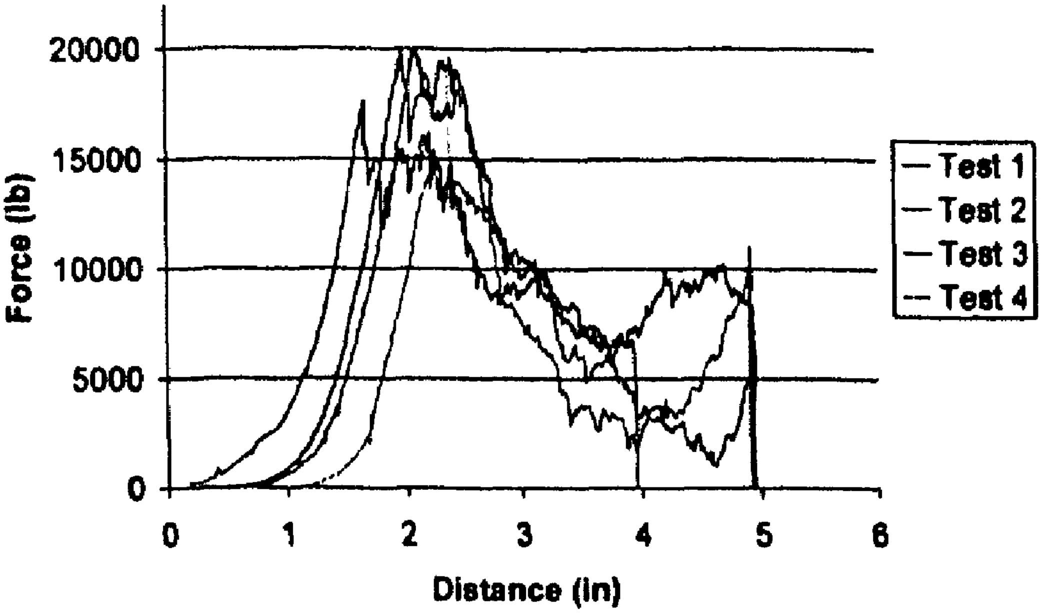
FIG. 8 shows four separate graphs of the force of a shear bar having a 1⁄32" radius edge when being used to shear a bundle of newspaper.

Using the shear bar with a 1/64 inch radius on its edge, the maximum force found when shearing cardboard was about 6,000 pounds. For magazines the maximum force increased to about 8,000 pounds, and for newspapers the maximum force increased to nearly 10,000 pounds. FIG. 7 shows the plotted results for each iteration conducted using newspaper.

Using the shear bar with a 1/32 inch radius on its edge, the maximum force found for the cardboard was about 10,000 pounds and the maximum force for magazines was about 12,500 pounds. The maximum force recorded with newspaper was about 20,000 pounds. FIG. 7 shows the plotted results for each iteration conducted using newspaper.

Finite element analysis can be used to determine the strain experienced by the shear bars. Since the shear bar with the 1/32 inch radius edge radius resulted in the greatest forces, the maximum force recorded for newspaper for this shear bar was used in the finite element model to determine the maximum strain experienced by the shear bar. Through ANSYS the maximum strain was calculated to be 0.028 in/in for an applied force of 20,000 pounds. The maximum strain was located on the top of the shear bar directly at the center of the shear bar. The rate of change of the strain gage voltage for shearing newspaper using this shear bar from the initial application of force until the maximum voltage was reached was calculated to be about 0.727 mV/s. Thus, for example, for a baler having this shear bar used for baling newspaper, the predetermined strain threshold for detecting jams can be set at 0.028 for detecting a jam. The rate of change of the strain gage voltage alternatively can be used as a threshold to detect whether a jam has occurred.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope and spirit of these claims.

We claim:

1. In a baler having a ram and a shear bar, the baler being prone to jamming from material being process by the baler, an apparatus comprising:

at least one strain gage mounted on the shear bar of the baler, wherein the baler experiences increased strain when the baler becomes jammed;

a controller electrically connected to the strain gage and being operable to deactivate the ram if the strain of the shear bar exceeds a predetermined strain value corresponding to a jamming condition;

an electrical panel that connects high voltage line power to the baler; and a control panel connected to the electrical panel and operable to supply low-voltage control power to the baler;

wherein the electrical panel comprises a first trapped key switch for receiving a removable, first key, the first trapped key switch being operable to move between an on position to allow the line power to be connected to the baler and an off position to prevent the connection of line power to the baler, wherein the first trapped key switch is operatively connected to the controller and cannot be manually moved from the off position to the on position unless the controller sends an electrical signal to the first key switch;

wherein the control panel comprises a second trapped key switch for receiving a removable, second key, the second trapped key switch being operable to move between an on position to allow the control power to be turned on and an off position to prevent the control power from being turned on, wherein the second trapped key switch is operatively connected to the controller and cannot be manually moved from the off position to the on position unless the controller sends an electrical signal to the second key switch.

2. The apparatus of claim 1, further comprising an alarm mechanism operable to produce an audible or visual warning signal if the strain of the sheer bar exceeds the predetermined strain value to indicate that a jam has occurred.

3. The apparatus of claim 1, wherein the ram comprises a hydraulically activated ram and the controller is operable to deactivate the ram if the strain of the shear bar exceeds a predetermined strain value and if the hydraulic pressure of the ram exceeds a predetermined pressure value corresponding to a jamming condition.

4. The apparatus of claim 1, wherein the controller controls the ram to move to a retracted position away from the shear bar and then deactivates the ram if the strain of the shear bar exceeds the predetermined strain value.

5. The apparatus of claim 1, wherein the controller de-energizes the ram if the strain of the shear bar exceeds the predetermined strain value.

6. The apparatus of claim 1, wherein the controller comprises a manual re-start button, wherein when the re-start button is activated, the controller sends electrical signals to the first and second trapped key switches to allow each switch to be moved to the on position.

7. The apparatus of claim 1, wherein the strain gage is mounted at the middle of the length of the shear bar.

* * * * *